United States Patent
Walster et al.

(10) Patent No.: US 7,028,065 B2
(45) Date of Patent: Apr. 11, 2006

(54) APPLYING TERM CONSISTENCY TO AN INEQUALITY CONSTRAINED INTERVAL GLOBAL OPTIMIZATION PROBLEM

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 703 days.

(21) Appl. No.: 10/017,574

(22) Filed: Dec. 13, 2001

(65) Prior Publication Data

US 2003/0115230 A1 Jun. 19, 2003

(51) Int. Cl.
G06F 7/38 (2006.01)

(52) U.S. Cl. ...................................................... 708/446
(58) Field of Classification Search ................. 708/446, 708/490, 160, 200, 207
See application file for complete search history.

(56) References Cited

U.S. PATENT DOCUMENTS 4,819,197 A * 4/1989 Blais ........................ 708/207

OTHER PUBLICATIONS

Elijah et al., An algorithm for optimization problems with functional inequality constraints, 1976, IEEE Transactions on automatic ocntrol vol. AC–21, No. 2, pp. 184–193.*

Kolev et al., An interval method for global inequality-constraint optimization problems, 2000, IEEE International symposium on circuits and systems, pp. 617–620.*

William Walster, Intervals: the connection between computing and the world, 2000, IEEE, pp. 859–864.*

Pascal Van Hentenryck, Vijay Saraswat and Yves Deville, "Design, Implementation, and Evaluation of the Constraint Language cc (FD)," Elsevier Science, Inc., 1998, pp. 139–164.

E.R. Hansen, "Global Optimization Using Interval Analysis," Marcel Dekker, Inc., New York, NY, 1992.

R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63–78 http://interval.louisiana.edu/preprints.html.

R. B. Kearfott, Algorithm 763: Interval Arithmetic: A Fortran 90 Module for an Interval Data Type, ACM Trans. Math. Software, 22, vol. 4, 1996, pp. 385–392. http://interval.louisiana.edu/preprints.html.

(Continued)

Primary Examiner—Todd Ingberg
Assistant Examiner—Chat C. Do
(74) Attorney, Agent, or Firm—Park, Vaughan & Fleming, LLP

(57) ABSTRACT

One embodiment of the present invention provides a system that solves a global optimization problem specified by a function $f$ and a set of inequality constraints $p_i(x) \leq 0$ (i=1, . . . , m), wherein $f$ and $p_i$ are scalar functions of a vector $x=(x_1, x_2, x_3, \ldots x_n)$. The system operates by receiving a representation of the function $f$ and the set of inequality constraints, and then storing the representation in a memory within the computer system. Next, the system performs an interval inequality constrained global optimization process to compute guaranteed bounds on the minimum value of the function $f(x)$ subject to the set of inequality constraints. While performing the interval global optimization process, the system applies term consistency at various places in the process over a subbox X, and excludes any portion of the subbox X that violates term consistency.

27 Claims, 8 Drawing Sheets

OTHER PUBLICATIONS

R. B. Kearfott and M. Novoa III, "Algorithm 681: INTBIS, A portable interval Newton/bisection package", ACM Trans. Math Software, vol. 16, No. 2, pp. 152–147. http://www.netlib.org/toms/681.

R. B. Kearfott, M. Dawande, K.S. Du, and C. Hu, "INTLIB: A Portable Fortran 77 Interval Standard Function Library," ACM Trans. Math. Software, 20, vol. 4, Dec. 1994, pp. 447–458.

R. B. Kearfott and G. W. Walster, "On Stopping Criteria in Verified Nonlinear Systems or Optimization Algorithms," ACM Trans. Math. Software, 26, vol. 3, Sep. 2000, pp. 323–351. The publication itself saysReceived: Jul. 1999; revised: Mar. 2000; accepted: Mar. 2000. http://interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051–1065.

A. Neumaier, "The Enclosure of Solutions of Parameter-Dependent Systems of Euqations," Cambridge University Press, Cambridge, 1990, ISBN: 0–12–505630–3, Reliability in Computing pp. 269–286.

S.M. Rump, "Verification Methods for Dense and Sparse Systems of Equations," in Topics in Validated Computations: Proceedings of the IMACS–GAMM International Workshop on Validated Computations, University of Oldenburg, J. Herzberger, ed., Elsevier Studies in Computational Mathematics, Elsevier, 1994, pp. 63–136.

* cited by examiner $$X \equiv [\underline{x}, \bar{x}] = \{x \in \Re^* | \underline{x} \leq x \leq \bar{x}\}$$

$$Y \equiv [\underline{y}, \bar{y}] = \{y \in \Re^* | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})]$, $0 \notin Y$ $X/Y \subseteq \Re^*$, $0 \in Y$

FIG. 5

APPLYING TERM CONSISTENCY TO AN INEQUALITY CONSTRAINED INTERVAL GLOBAL OPTIMIZATION PROBLEM

RELATED APPLICATION

The subject matter of this application is related to the subject matter in a co-pending non-provisional application by the same inventors as the instant application and filed on the same day as the instant application entitled, "Applying Term Consistency to an Equality Constrained Interval Global Optimization Problem," having Ser. No. 10/017,573, and filing date 13 Dec. 2001.

BACKGROUND

1. Field of the Invention

The present invention relates to performing arithmetic operations on interval operands within a computer system. More specifically, the present invention relates to a method and an apparatus for using a computer system to solve a global optimization problem including inequality constraints with interval arithmetic and term consistency.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

One commonly performed computational operation is to perform inequality constrained global optimization to find a global minimum of a nonlinear objective function $f(x)$, subject to nonlinear inequality constraints of the form $p_i(x) \leq 0$ (i=1, ..., m). This can be accomplished using any members of a set of criteria to delete boxes, or parts of boxes that either fail to satisfy one or more inequality constraints, or cannot contain the global minimum $f^*$ given the inequality constraints are all satisfied. The set of criteria includes:

(1) the $f$_bar-criterion, wherein if $f$_bar is the smallest upper bound so far computed on $f$ within the feasible region defined by the inequality constraints, then any point x for which $f(x) > f$_bar can be deleted. Similarly, any box X can be deleted if $\inf(f(X)) > f$_bar;

(2) the monotonicity criterion, wherein if g(x) is the gradient of $f$ evaluated at a feasible point x for which all $p_i(x) < 0$ (i=1, ..., m), then any such feasible point x for which $g(x) \neq 0$ can be deleted. Similarly, any feasible box X can be deleted if $0 \notin g(X)$;

(3) the convexity criterion, wherein if $H_{ii}(x)$ is the i-th diagonal element of the Hessian of $f$, then any feasible point x for all which all $p_i(x) \leq 0$ (i=1, ..., m) and $H_{ii}(x) < 0$ (for i=1, ..., n) can be deleted. Similarly, any feasible box X can be deleted if $H_{ii}(X) < 0$ (for i=1, ..., n); and (4) the stationary point criterion, wherein any point x is deleted using the interval Newton technique to solve the John conditions. (The John conditions are described in "Global Optimization Using Interval Analysis" by Eldon R. Hansen, Marcel Dekker, Inc., 1992.)

All of these criteria work best "in the small" when the objective function $f$ is approximately linear or quadratic and "active" constraints are approximately linear. An active constraint is one that is zero at a solution point. For large intervals containing multiple local minima and maxima none of the criteria will succeed in deleting much of a given box. In this case the box is split into two or more sub-boxes, which are then processed independently. By this mechanism all the inequality constrained global minima of a nonlinear objective function can be found.

One problem is applying this procedure to large n-dimensional interval vectors (or boxes) that contain multiple local minima. In this case, the process of splitting in n-dimensions can lead to exponential growth in the number of boxes to process.

It is well known that this problem (and even the problem of computing "sharp" bounds on the range of a function of n-variables over an n-dimensional box) is an "NP-hard" problem. In general, NP-hard problems require an exponentially increasing amount of work to solve as n, the number of independent variables, increases.

Because NP-hardness is a worst-case property and because many practical engineering and scientific problems have relatively simple structure, one problem is to use this simple structure of real problems to improve the efficiency of interval inequality constrained global optimization algorithms.

Hence, what is needed is a method and an apparatus for using the structure of a nonlinear objective function to improve the efficiency of interval inequality constrained global optimization software. To this end, what is needed is a method and apparatus that efficiently deletes "large" boxes or parts of large boxes that the above criteria can only split.

SUMMARY

One embodiment of the present invention provides a system that solves a global optimization problem specified by a function $f$ and a set of inequality constraints $p_i(x) \leq 0$ ($i=1, \ldots, m$), wherein $f$ is a scalar function of a vector $x=(x_1, x_2, x_3, \ldots x_n)$. The system operates by receiving a representation of the function $f$ and the set of inequality constraints, and then storing the representation in a memory within the computer system. Next, the system applies term consistency to the set of inequality constraints over a sub-box X, and excludes any portion of the sub-box X that violates any member of the set of inequality constraints.

In one embodiment of the present invention, the system additionally linearizes the set of inequality constraints to produce a set of linear inequality constraints with interval coefficients. Next, the system preconditions the set of linear inequality constraints using additive linear combinations to produce a preconditioned set of linear inequality constraints. The system then applies term consistency to the set of preconditioned linear inequality constraints over the sub-box X, and excludes any portion of the sub-box X that violates set of preconditioned linear inequality constraints. In a variation on this embodiment, the system additionally keeps track of a least upper bound $f\_bar$ of the function $f(x)$ in the feasible region, and includes $f(x) \leq f\_bar$ in the set of inequality constraints prior to linearizing the set of inequality constraints. In a variation on this embodiment, the system removes from consideration any inequality constraints that are not violated by more than a predetermined amount for purposes of applying term consistency prior to linearizing the set of inequality constraints.

In one embodiment of the present invention, performing the interval global optimization process involves keeping track of a least upper bound $f\_bar$ of the function $f(x)$ in the feasible region, and removing from consideration any sub-box for which $f(x) > f\_bar$. It also involves applying term consistency to the inequality $f(x) \leq f\_bar$ over the sub-box X, and excluding any portion of the sub-box X that violates the inequality.

In one embodiment of the present invention, if the sub-box X is strictly feasible ($p_i(X) < 0$ for all $i=1, \ldots, n$). performing the interval global optimization process involves determining a gradient $g(x)$ of the function $f(x)$, wherein $g(x)$ includes components $g_i(x)$ ($i=1, \ldots, n$). Next, the system removes from consideration any sub-box for which $g(x)$ is bounded away from zero, thereby indicating that the sub-box does not include an unconstrained local extremum. The system also applies term consistency to each component $g_i(x)=0$ ($i=1, \ldots, n$) of $g(x)=0$ over the sub-box X, and excludes any portion of the sub-box X that violates a component.

In one embodiment of the present invention, if the sub-box X is strictly feasible ($p_i(X)<0$ for all $i=1, \ldots, n$), the system performs the interval global optimization process by determining diagonal elements $H_{ii}(x)$ ($i=1, \ldots, n$) of the Hessian of the function $f(x)$, and removing from consideration any sub-box for which a diagonal element of the Hessian is always negative, indicating that the function $f$ is not convex and consequently does not contain a global minimum within the sub-box. The system also applies term consistency to each inequality $H_{ii}(x) \geq 0$ ($i=1, \ldots, n$) over the sub-box X, and excludes any portion of the sub-box X that violates the inequalities.

In one embodiment of the present invention, if the sub-box X is strictly feasible (that is $p_i(X)<0$ for all $i=1, \ldots, m$), then the system uses the interval Newton method to find a box X that contains a stationary point y where the gradient of $f$, $g(y)=0$. This involves forming and solving the system of equations $M(x,X)(y-x)=r(x)$ for the bounding box Y on y: where $M(x,X)=BJ(x,X)$; $J(x,X)$ is the Jacobian of the objective function $f$ expanded about the point x over the sub-box X; B is the approximate inverse of the center of $J(x,X)$; and $r(x)=-Bg(x)$. The system also applies term consistency to each equality $(Bg(x))_i=0$ ($i=1, \ldots, n$) for each variable $x_i$ ($i=1, \ldots, n$) over the sub-box X, and excludes any portion of the sub-box X that violates an equality.

For any function of n-variables $f(x)$ there are different ways to analytically express a component $x_j$ of the vector x. For example, one can write $f(x)=g(x_j)-h(x)$, where $g(x_j)$ is a term in $f$ for which it is possible to solve $g(x_j)=y$ for an element of x, $x_j$, using $g^{-1}(y)$. For each of these rearrangements, if a given interval box X is used as an argument of h, then the new interval $X_j^+$ for the j-th component of X, is guaranteed to be at least as narrow as the original, $X_j$.

$$X_j^+ = X_j \cap X'_j \text{ where } X'_j = g^{-1}(h(X)).$$

This process is then be iterated using different terms g of the function $f$. After reducing any element $X_j$ of the box X to $X_j^+$, the reduced value can be used in X thereafter to speed up the reduction process using other component functions if $f$ is a component of the vector function f.

Hereafter, the notation $g(x_j)$ for a term of the function $f(x)$ implicitly represents any term of any component function. This eliminates the need for additional subscripts that do not add clarity to the exposition.

In one embodiment of the present invention, applying term consistency involves symbolically manipulating an equation within the computer system to solve for a first term, $g(x_j)$, thereby producing a modified equation $g(x_j)=h(x)$, wherein the first term $g(x_j)$ can be analytically inverted to produce an inverse function $g^-(y)$. Next, the system substitutes the sub-box X into the modified equation to produce the equation $g(X'_j)=h(X)$ and then solves for $X'_j=g^{-1}(h(X))$. The system then intersects $X'_j$ with the interval $X_j$ to produce a new sub-box $X^+$, which contains all solutions of the equation within the sub-box X, and wherein the size of the new sub-box $X^+$ is less than or equal to the size of the sub-box X.

In one embodiment of the present invention, the system additionally performs the Newton method on the John conditions.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
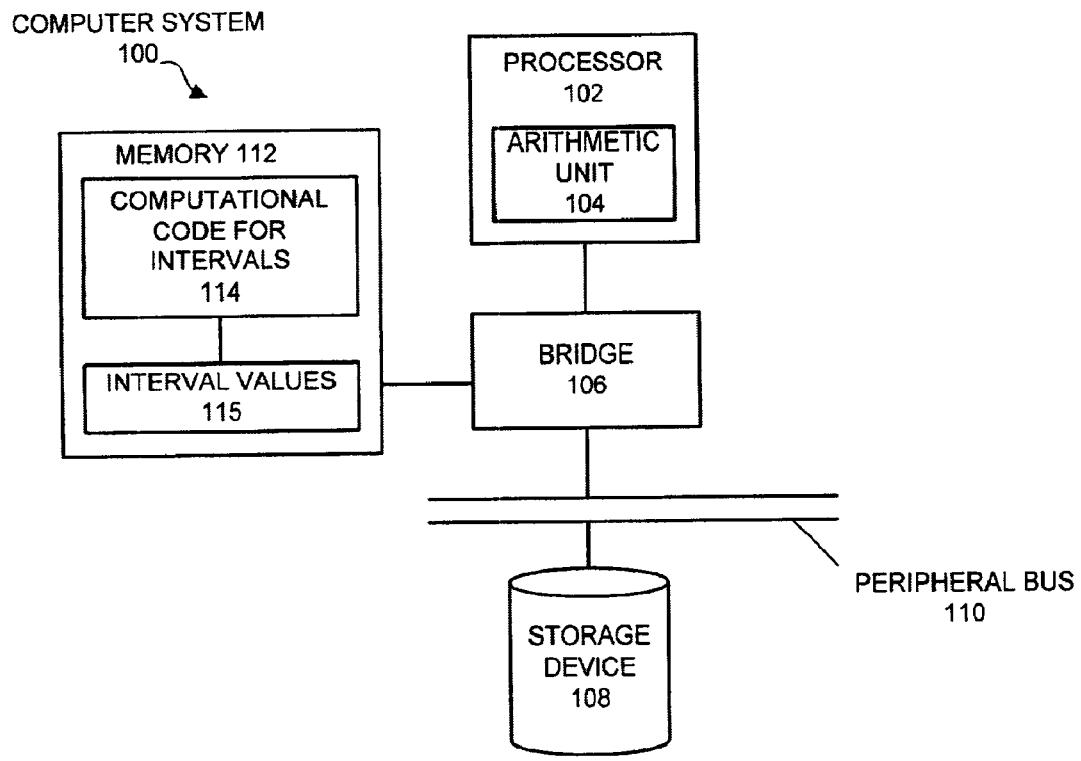
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 1100 illustrated in FIG. 1.

Compiling and Using Interval Code

Figure 2:
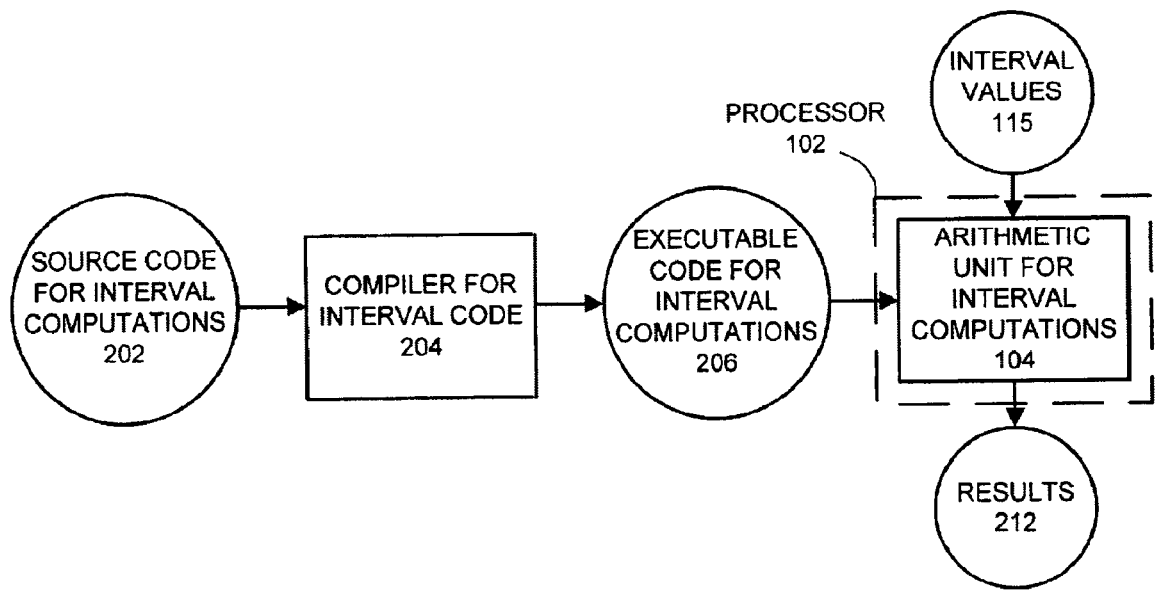
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
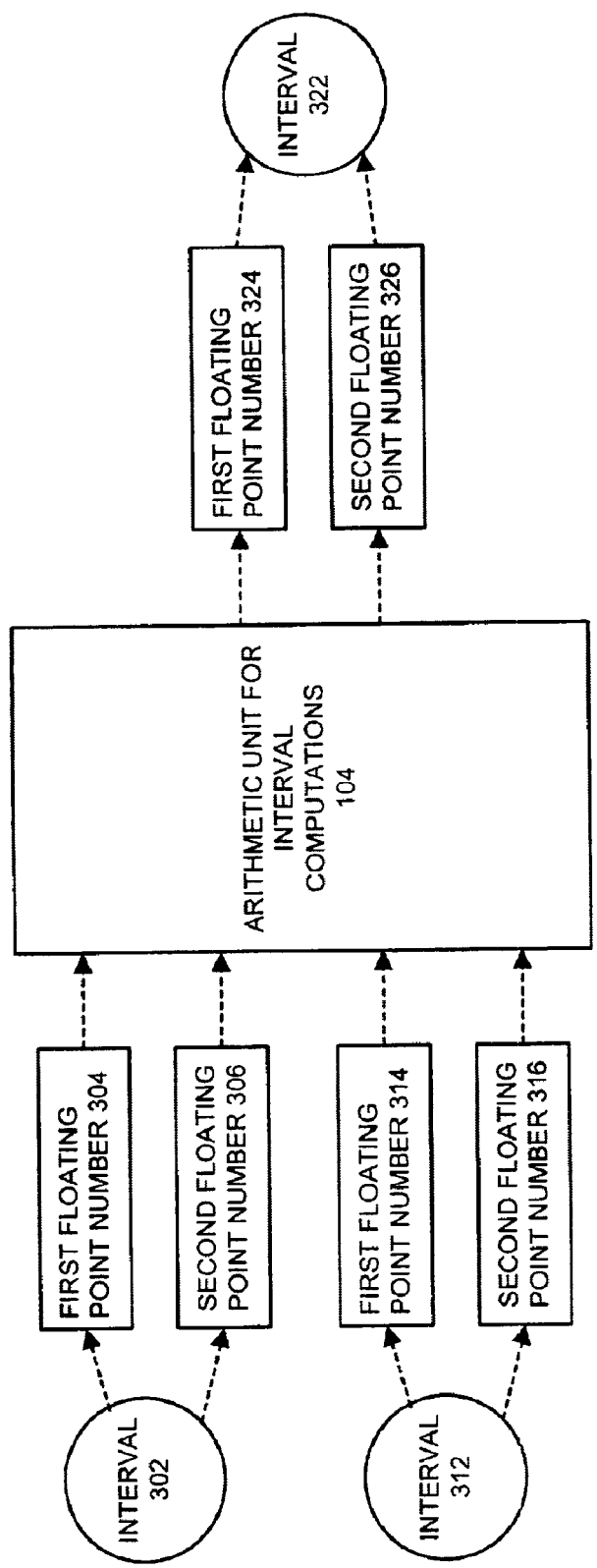
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
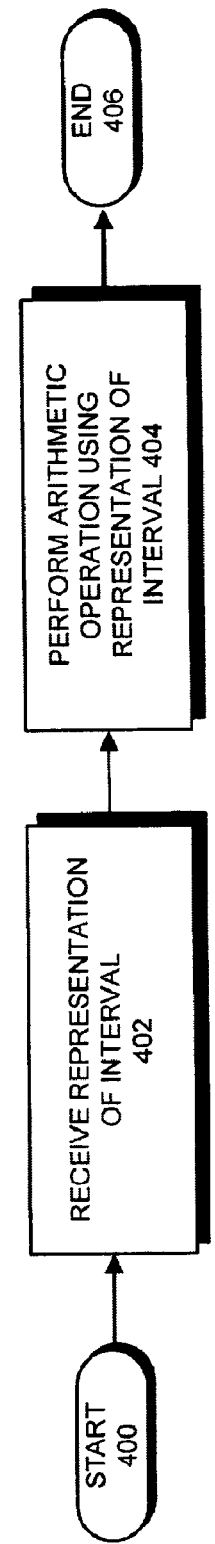
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\}$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X-Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Term Consistency

Figure 6:
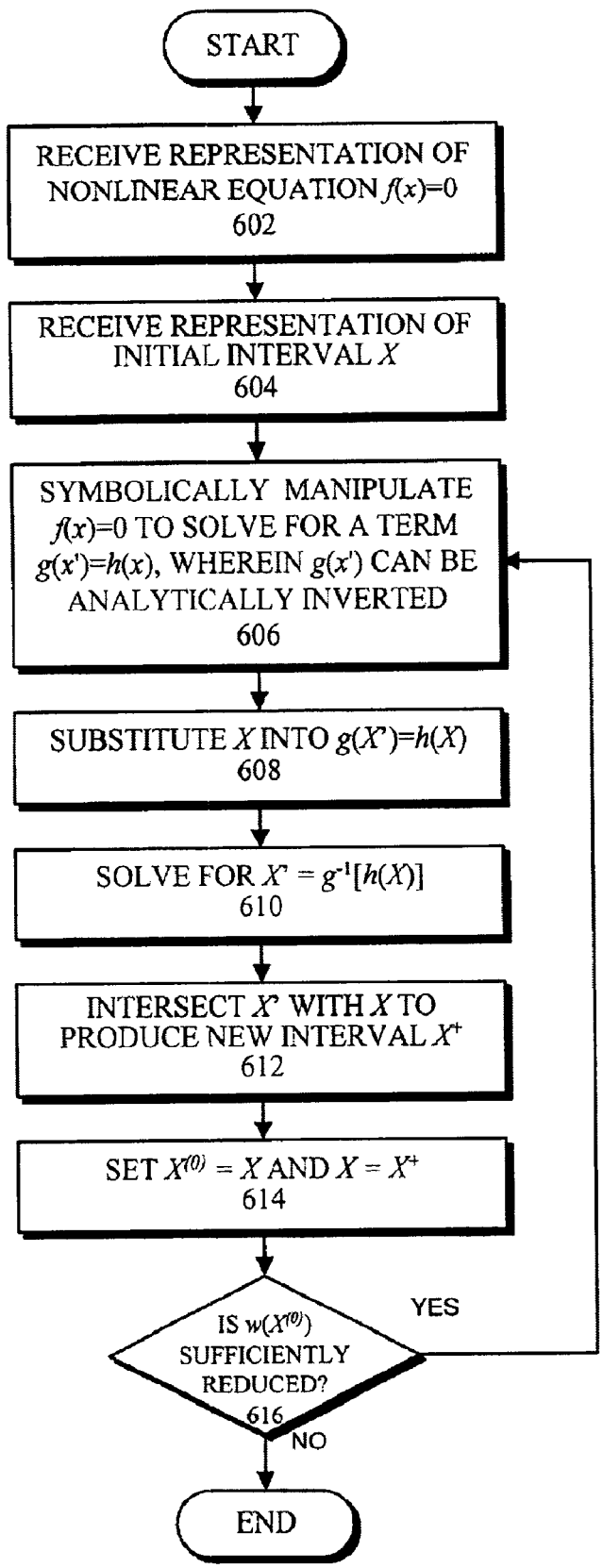
FIG. 6 is a flow chart illustrating the process of finding an interval solution to a nonlinear equation using term consistency in accordance with an embodiment of the present invention.
Figure 7A:
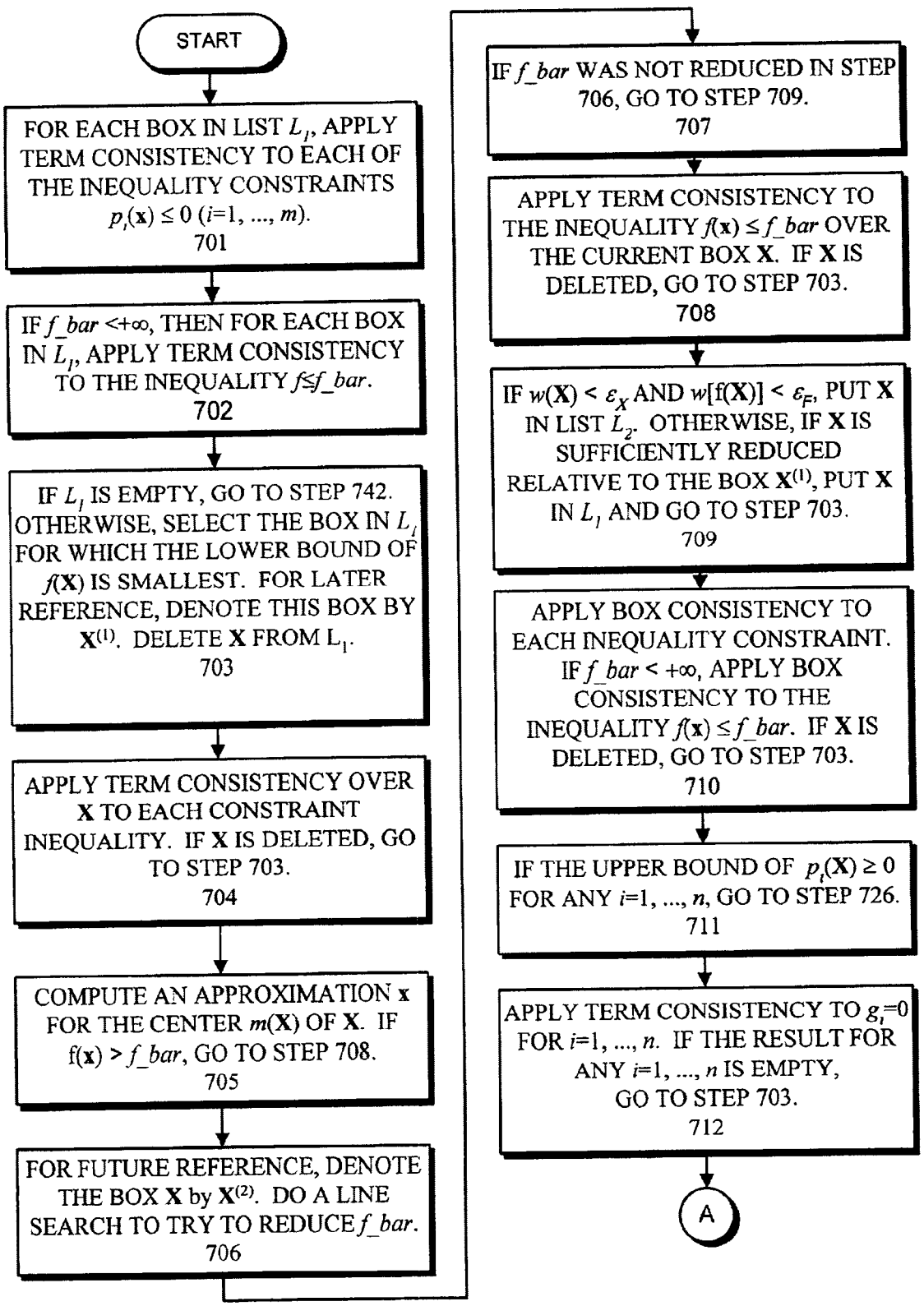
FIG. 7A presents a portion of a flow chart illustrating the process of using term consistency to solve an interval global optimization problem with inequality constraints in accordance with an embodiment of the present invention.
Figure 7B:
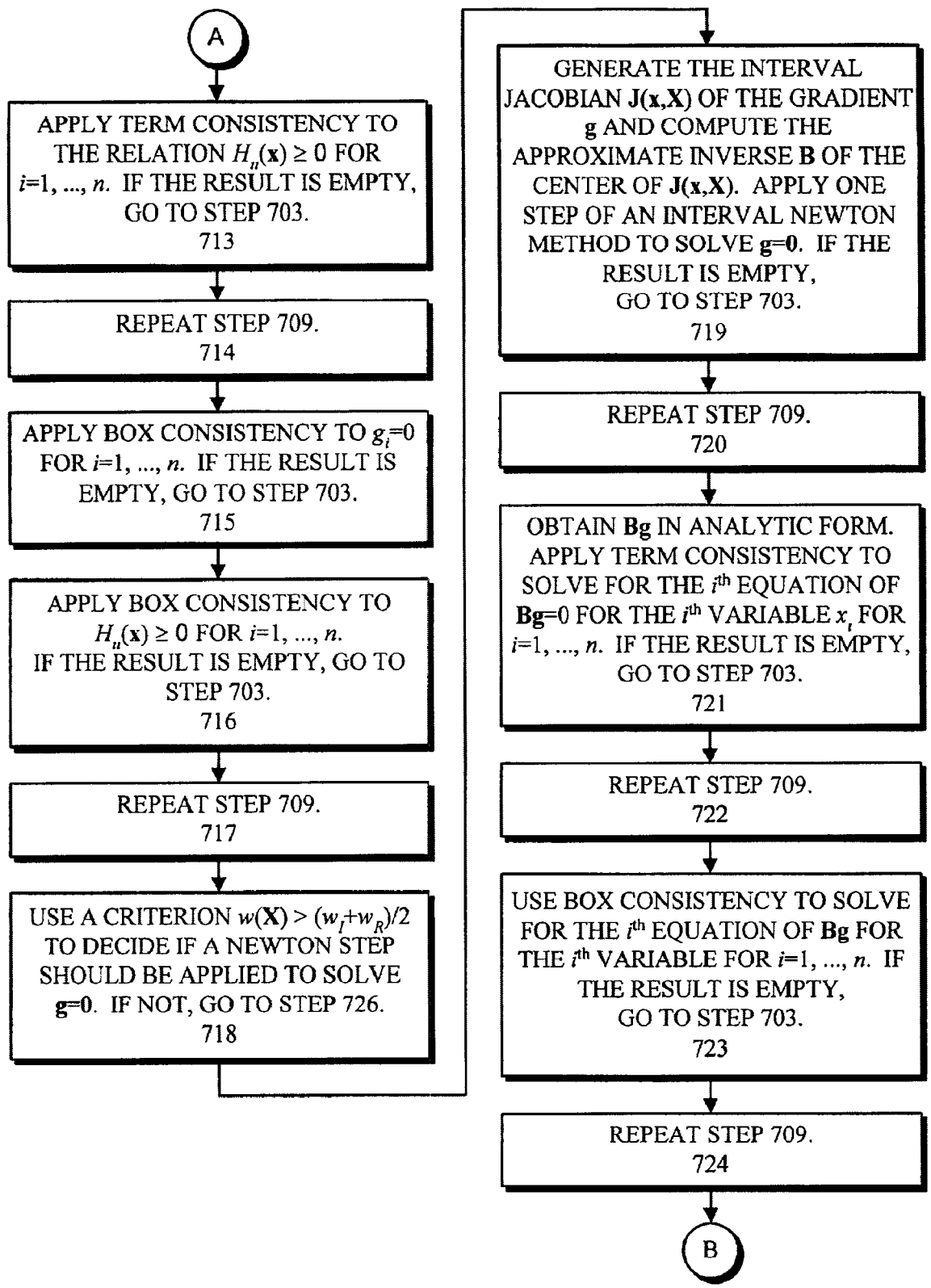
FIG. 7B presents a portion of a flow chart illustrating the process of using term consistency to solve an interval global optimization problem with inequality constraints in accordance with an embodiment of the present invention.
Figure 7C:
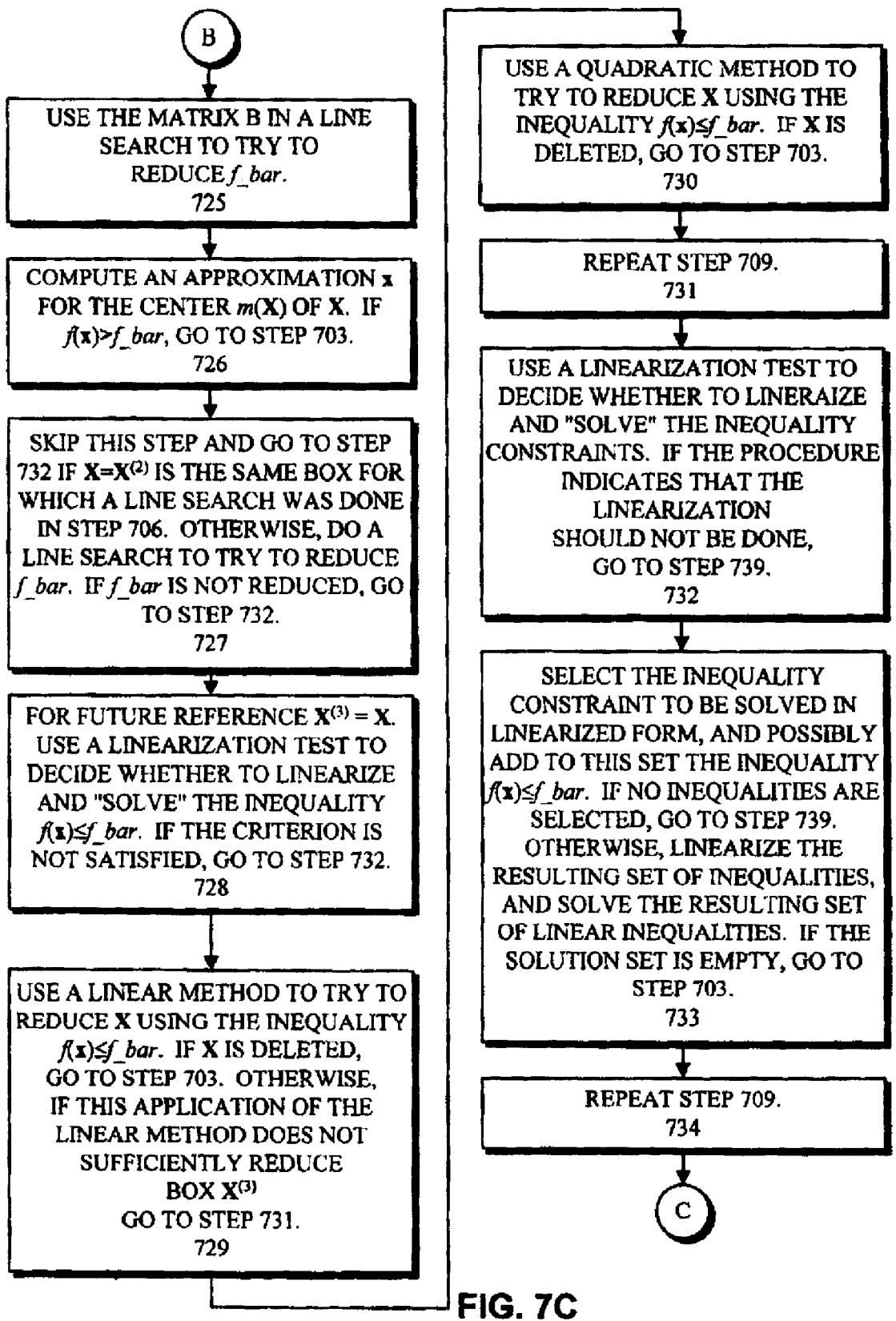
FIG. 7C presents a portion of a flow chart illustrating the process of using term consistency to solve an interval global optimization problem with inequality constraints in accordance with an embodiment of the present invention.
Figure 7D:
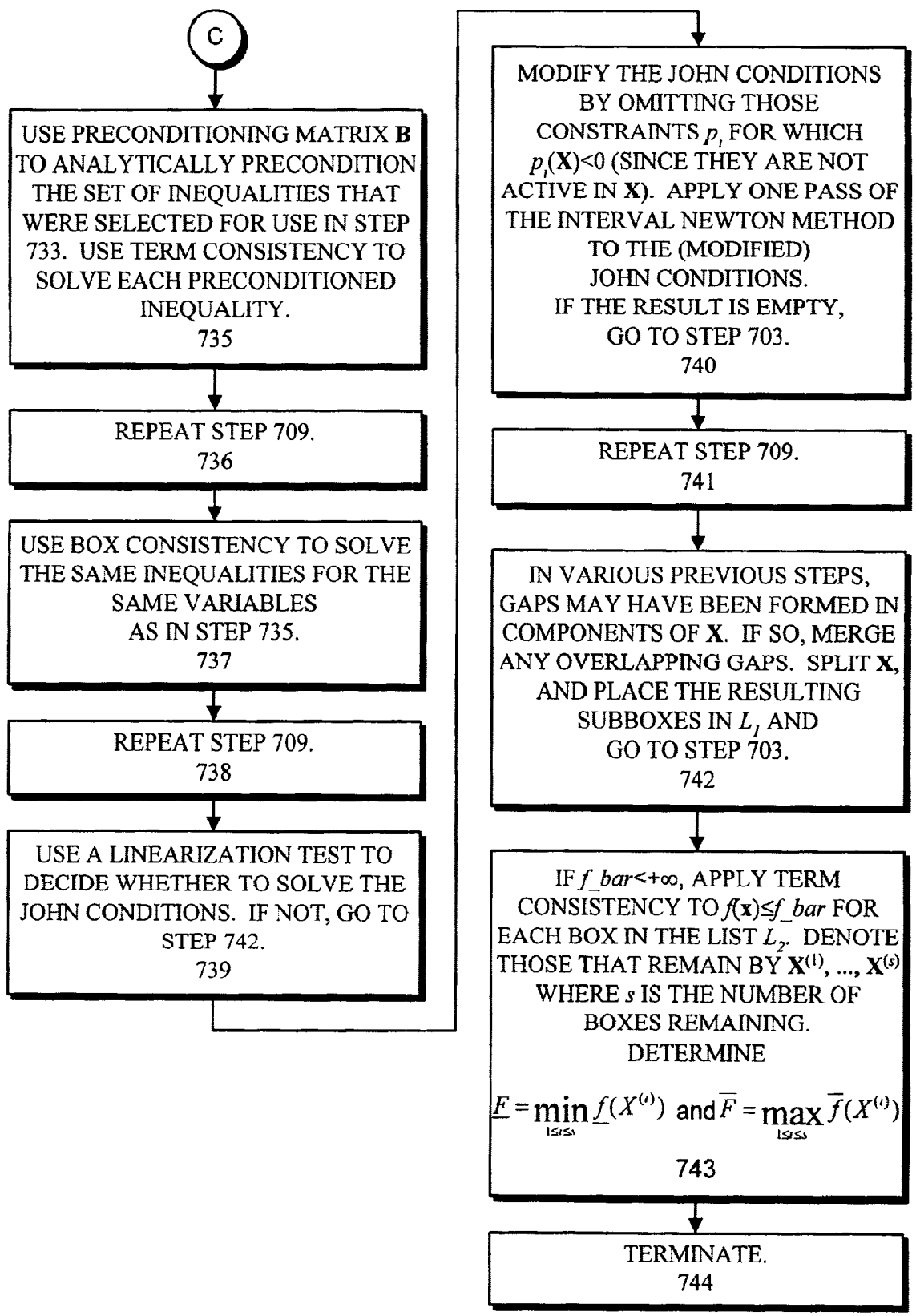
FIG. 7D presents a portion of a flow chart illustrating the process of using term consistency to solve an interval global optimization problem with inequality constraints in accordance with an embodiment of the present invention.

FIG. 6 is a flow chart illustrating the process of solving a nonlinear equation through interval arithmetic and term consistency in accordance with an embodiment of the present invention. The system starts by receiving a representation of a nonlinear equation $f(x)=0$ (step 602), as well as a representation of an initial interval X (step 604). Next, the system symbolically manipulates the equation $f(x)=0$ into the form $g(x')-h(x)=0$ to solve for a term $g(x')=h(x)$, wherein the term $g(x')$ can be analytically inverted to produce and inverse function $g^{-1}(y)$ (step 606).

Next, the system substitutes the initial interval X into $h(x)$ to produce the equation $g(X')=h(X)$ (step 608). The system then solves for $X'=g^{-1}(h(X))$ (step 610). The resulting interval $X'$ is then intersected with the initial interval X to produce a new interval $X^+$ (step 612).

At this point, the system can terminate. Otherwise, the system can perform further processing. This further processing involves setting temporarily saving X by setting $X^{(0)}=X$ and by setting $X=X^+$ (step 614). Next, if $w(X^{(0)})$ has been sufficiently reduced (step 616), the system returns to step 606 for another iteration of term consistency on another term g of $f(x)$. Otherwise, the process terminates.

Examples of Applying Term Consistency

For example, suppose $f(x)=x^2-x+6$. We can define $g(x)=x^2$ and $h(x)=x-6$. Let $X=[-10,10]$. The procedural step is $(X')^2=X-6=[-16,4]$. Since $(X')^2$ must be non-negative, we replace this interval by [0,4]. Solving for $X'$, we obtain $X'=\pm[0,2]$. In replacing the range of $h(x)$ (i.e., [-16,4]) by non-negative values, we have excluded that part of the range $h(x)$ that is not in the domain of $g(x)=x^2$.

Suppose that we reverse the roles of g and h and use the iterative step $h(X')=g(X)$. That is $X'-6=X^2$. We obtain $X'=[6,106]$. Intersecting this result with the interval $[-10,10]$, of interest, we obtain [6,10]. This interval excludes the set of values for which the range of $g(X)$ is not in the intersection of the domain of $h(X)$ with X.

Combining these results, we conclude that any solution of $f(X)=g(X)-h(X)=0$ that occurs in $X=[-10,10]$ must be in both [-2,2] and [6,10]. Since these intervals are disjoint, there can be no solution in [-10,10].

In practice, if we already reduced the interval from [-10,10] to [-2,2] by solving for g, we use the narrower interval as input when solving for h.

This example illustrates the fact that it can be advantageous to solve a given equation for more than one of its terms. The order in which terms are chosen affects the efficiency. Unfortunately, it is not known how best to choose the best order.

Also note that there can be many choices for $g(x)$. For example, suppose we use term consistency to narrow the interval bound X on a solution of $f(x)=ax^4+bx+c=0$. We can let $g(x)=bx$ and compute $X'=-(aX^4+c)/b$ or we can let $g(x)=ax^4$ and compute $X'=\pm[-(bX+c)/a]^{1/4}$. We can also separate $x^4$ into $x^2*x^2$ and solve for one of the factors $X'=\pm[-(bX+c)/(aX^2)]^{1/2}$.

In the multidimensional case, we may solve for a term involving more than one variable. We then have a two-stage process. For example, suppose we solve for the term $1/(x+y)$ from the function $f(x,y)=1/(x+y)-h(x,y)=0$. Let $x \in X=[1,2]$ and $y \in Y=[0.5,2]$. Suppose we find that $h(X,Y)=[0.5,1]$. Then $1/(x+y) \in [0.5,1]$ so $x+y \in [1,2]$. Now we replace y by $Y=[0.5,$ 2] and obtain the bound [−1,1.5] on X. Intersecting this interval with the given bound X=[1,2] on x, we obtain the new bound X'=[1,1.5].

We can use X' to get a new bound on h; but his may require extensive computing if h is a complicated function; so suppose we do not. Suppose that we do, however, use this bound on our intermediate result x+y=[1,2]. Solving for y as [1,2]−X', we obtain the bound [−0.5,1]. Intersecting this interval with Y. we obtain the new bound Y'=[0.5,1] on y. Thus, we improve the bounds on both x and y by solving for a single term of $f$.

The point of these examples is to show that term consistency can be used in many ways both alone and in combination with the interval Newton algorithm to improve the efficiency with which roots of a single nonlinear equation can be computed. The same is true for systems of nonlinear equations.

Term Consistency and Inequality Constrained Interval Global Optimization

FIGS. 7A–7D collectively present a flow chart illustrating the process of using term consistency in solving an interval global optimization problem with inequality constraints in accordance with an embodiment of the present invention. Generally, we seek a solution in a single box specified by the user. However, any number of boxes can be initially specified.

The boxes can be disjoint or overlap. However, if they overlap, a minimum at a point that is common to more than one box is separately found as a solution in each box containing it. In this case, computing effort is wasted. If the user does not specify an initial box or boxes, we use a default box. The process finds the global minimum in the set of points formed by the set of boxes. We assume these initial boxes are placed in a list $L_1$ of boxes to be processed.

Suppose the user of the process knows a point x_bar that is guaranteed to be feasible. If so, we use this point to compute an initial upper bound $f$_bar on the global minimums$f^*$. If x_bar cannot be represented exactly on the computer, the system forms a representable interval vector X containing x_bar. We evaluate $f(X)$ and obtain [lower bound $f(X)$,upper bound $f(X)$]. Even if rounding and/or dependence are such that X cannot be numerically proven to be certainly feasible, we rely upon the user and assume that X contains a feasible point. Therefore, we set $f$_bar equal to the upper bound of $f(X)$.

Also the user may know an upper bound $f$_bar on $f^*$ even though he may not know where (or even if) $f$ takes on such a value in the feasible region defined by the inequality constraints. If so, we set $f$_bar equal to this known bound. If the known bound is not representable on the computer, the system rounds the value up to a larger value that is representable.

If no feasible point is known and no upper bound on $f^*$ is known, we set $f$_bar=+∞. We assume the user has specified a box size tolerance $\epsilon_X$ and a function width tolerance $\epsilon_F$.

Since the process may use a procedure for finding an unconstrained minimum, the system provides the parameters needed therein. Therefore, the system specifies $w_R$ and $w_I$. In doing so, it sets $w_R$=0. If a single box $X^{(0)}$ is given, the system sets $w_I$=w($X^{(0)}$), wherein w($X^{(0)}$) is the maximum of the widths of all elements in the vector $X^{(0)}$. If more than one box is given, the system sets $w_I$ equal to the width of the largest one. Also, the system sets $N^H$=0.

Thus, to initialize our process, the system specifies $\epsilon_X$, $\epsilon_F$, $w_R$, $w_I$, and the initial box(es). In addition, the system specifies a bound $f$_bar if one is known.

The steps of the process are to be performed in the order given except as indicated by branching.

First, for each box in the list. $L_1$, the system applies term consistency to each of the inequality constraints $p_i(x) \leq 0$ (i=1, . . . , m) (step 701).

If $f$_bar<+∞, then for each box in $L_1$, the system applies term consistency to the inequality $f \leq f$_bar (step 702).

If $L_1$ is empty, the system goes to step 742. Otherwise, the system selects (for the next box X to be processed) the box in $L_1$ for which the lower bound of $f(X)$ is smallest. For later reference, the system denotes this box by $X^{(1)}$. The system also deletes X from $L_1$ (step 703).

The system applies term consistency over X to each constraint inequality. If X is deleted, the system goes to step 703. The system skips this step if X has not changed since step 701. (step 704).

Next, the system computes an approximation x for the center m(X) of X. If the upper bound of $f(x)$>$f$_bar, the system goes to step 708 (step 705).

For future reference, the system denotes the box X by $X^{(2)}$. Next, the system does a line search to try to reduce $f$_bar (step 706).

If $f$_bar was not reduced in step 706, the system goes to step 709 (step 707).

Next, the system applies term consistency to the inequality $f(x) \leq f$_bar. If X is deleted, the system goes to step 703 (step 708).

If w(X)<$\epsilon_X$ and w[$f(X)$]<$\epsilon_F$, the system puts X in list $L_2$. Otherwise, if X is sufficiently reduced relative to the box $X^{(1)}$ defined in step 703, the system puts X in $L_1$ and goes to step 703 (step 709). We say that a box X is sufficiently reduced if any component of X is reduced by an amount that is at least a fraction (say 0.25) of the width of the widest component of X.

Next, the system applies box consistency to each inequality constraint. If $f$_bar<+∞, the system also applies box consistency to the inequality $f(x) \leq f$_bar. If X is deleted, the system goes to step 703 (step 710).

If the upper bound of $p_i(X) \geq 0$ for any i=1, . . . , n, (i.e., if X is not certainly strictly feasible), the system goes to step 726 (step 711).

Next, the system applies term consistency to $g_i(x)$=0 for i=1, . . . , n, where g is the gradient of the objective function $f$. If the result for any i=1, . . . , n is empty, the system goes to step 703 (step 712). Note that the steps 712 through 725 do not use inequality constraints because none are active for the current box X.

Otherwise, the system applies term consistency to the relation $H_{ii}(x) \geq 0$ for i=1, . . . , n, where $H_{ii}$ is a diagonal element of the Hessian of $f$. If the result is empty, the system goes to step 703 (step 713).

Next, the system repeats step 709 (step 714).

The system then applies box consistency to $g_i$=0 for i=1, . . . , n. If the result is empty, the system goes to step 703 (step 715).

Next, the system applies box consistency to $H_{ii}(x) \geq 0$ for i=1, . . . , n. If the result is empty, the system goes to step 703 (step 716).

Next, the system repeats step 709 (step 717).

The system then uses a criterion w(X)>($w_I$+$w_R$)/2 to decide if a Newton step should be applied to solve g=0. If not, the system goes to step 726 (step 718). Note that, $w_I$ denotes the width of the smallest box for which $M^I$=BJ(x,X) is irregular. If $M^I$ is regular for a given box, $w_R$ denotes the width of the largest box for which $M^I$ is regular.

The system generates the interval Jacobian J(x,X) of the gradient g and computes the approximate inverse B of the center of J(x,X). The system also applies one step of an interval Newton method to solve g=0. If the result is empty, the system goes to step 703 (step 719).

Next, the system repeats step 709 (step 720).

The system then uses the matrix B found in step 719 to obtain Bg in analytic form. The system applies term consistency to solve the i-th equation of Bg=0 for the i-th variable $x_i$ for i=1, . . . , n. If the result is empty, the system goes to step 703 (step 721).

Next, the system repeats step 709 (step 722).

The system uses box consistency to solve the i-th equation of Bg (as obtained in step 721) for the i-th variable for i=1, . . . , n. If the result is empty, the system goes to step 703 (step 723).

Next, the system repeats step 709 (step 724).

The system uses the matrix B found in step 719 in a line search method to try to reduce the upper bound $f$_bar (step 725). A line search can be performed as follows. Suppose we evaluate the gradient g(x) of $f(x)$ at a point x. Note that $f$ decreases (locally) in the negative gradient direction from x. A simple procedure for finding a point where $f$ is small is to search along this half-line. Let x be the center of the current box. Define the half-line of points y($\alpha$)=x−$\alpha$g(x) where $\alpha \geq 0$. We now use a standard procedure for finding an approximate minimum of the objective function $f$ on this half-line. We first restrict our region of search by determining the value $\alpha'$ such that y($\alpha'$)=x−$\alpha'$g is on the boundary of the current box X, and search between x and x'=y($\alpha'$). We use the following procedure. Each application of the procedure requires an evaluation of $f$. Procedure: If $f(x')<f(x)$, replace x by (x+x')/2. Otherwise, we replace x' by (x+x')/2.

Next, the system computes an approximation x for the center m(X) of X. If $f(x)>f$_bar, the system goes to step 703 (step 726).

The system skips this step and goes to step 732 if X=$X^{(2)}$, the same box for which a line search was done in step 706. Otherwise, the system does a line search to try to reducer $f$_bar. If $f$_bar is not reduced, the system goes to step 732 (step 727).

For future reference, the system denotes X by $X^{(3)}$. The system then uses a linearization test to decide whether to linearize and "solve" the inequality $f(x) \leq f$_bar. If this condition is not satisfied, the system goes to step 732 (step 728).

The system uses a linear method to try to reduce X using the inequality $f(x) \leq f$_bar. If X is deleted, the system goes to step 703. Otherwise, if this application of the linear method does not sufficiently reduce the box $X^{(3)}$, the system goes to step 731 (step 729).

The system uses a quadratic method to try to reduce X using the inequality $f(x) \leq f$_bar. If X is deleted, the system goes to step 703 (step 730).

Next, the system repeats step 709 (step 731).

The system uses a criterion similar to that in step 718 to decide whether to linearize and "solve" the inequality constraints. If the procedure indicates that the linearization should not be done, the system goes to 739 (step 732).

Next, the system selects the Inequality constraints to be solved in linearized form, and possibly adds to this set the inequality $f(x) \leq f$_bar. Note that the selection process removes from consideration any inequality constraints that are not sufficiently violated. If no inequalities are selected, the system goes to step 739. Otherwise, the system linearizes the resulting set of inequalities, and solves the resulting set of linear inequalities. If the solution set is empty, the system goes to step 703 (step 733).

Next, the system repeats step 709 (step 734).

The system then uses the preconditioning matrix B formed at step 733 to analytically precondition the set of inequalities that were selected for use in step 733. The system also uses term consistency to solve each of the preconditioned inequalities. In so doing, each inequality is solved for the same (single) variable for which the linearized inequality was solved in step 733 (step 735).

Next, the system repeats step 709 (step 736).

The system uses box consistency to solve the same inequalities for the same variables as in step 735 (step 737).

Next, the system repeats step 709 (step 738).

The system uses the linearization test to decide whether to solve the John conditions. If not, the system goes to step 742 (step 739).

The system modifies the John conditions by omitting those constraints $p_i$ for which $p_i(X)<0$ (since they are not active in X). The system applies one pass of the interval Newton method to the (modified) John conditions. If the result is empty, the system goes to step 703 (step 740).

Next, the system repeats step 709 (step 741).

In various previous steps, gaps may have been generated in components of X. If so, the system merges any of these gaps that overlap. The system then splits X, and places the resulting sub-boxes, in $L_1$ and goes to step 703 (step 742).

If f_bar<+∞, the system applies term consistency to $f(x) \leq f$_bar for each box in the list $L_2$. The system denotes those that remain by $X^{(1)}, \ldots, X^{(s)}$ where s is the number of boxes remaining. The system also determines $$\underline{F} = \min_{1 \leq i \leq s} \underline{f}(X^{(1)}) \text{ and } \overline{F} = \max_{1 \leq i \leq s} \overline{f}(X^{(1)}) \text{ (step 743).}$$

Finally, the system terminates (step 744).

After termination, w(X)<$\epsilon_X$ and w($f$(X))<$\epsilon_F$ for each remaining box X in the list $L_2$. Also, $$\underline{F} \leq f(x) \leq \overline{F}$$

for every point x in all remaining boxes. If, after termination, f_bar<+∞, we know there is a feasible point in the initial box(es). Therefore, we know that $$\underline{F} \leq f^* \leq \min\{\overline{f}, \overline{F}\}.$$

If, after termination, f_bar=+∞, then we have not found a certainly feasible point. There may or may not be one in $X^{(0)}$. However, we know that if a feasible point x does exist in $X^{(0)}$, then $$\underline{F} \leq f(x) \leq \overline{F}.$$

Suppose a feasible point exists. If our algorithm fails to find a certainly feasible point, then it does not produce an upper bound $f$_bar and cannot use the relations $f \leq f$_bar. In particular, it cannot delete local minima where $f(x)>f^*$. In this case, all local minima are contained in the set of output boxes.

If all of the initial box $X^{(0)}$ is deleted by our process, then we have proved that every point in $X^{(0)}$ is infeasible. Suppose that every point in $X^{(0)}$ is infeasible. Our process may prove this to be the case. However, we delete a sub-box of $X^{(0)}$ only if it is certainly infeasible. Rounding errors and/or dependence may prevent us from proving certain infeasibility of an infeasible sub-box. Increased wordlength can reduce rounding errors and decreasing $\epsilon_X$ can reduce the effect of dependence by causing sub-boxes to eventually become smaller. However, neither effect can completely be removed.

Suppose $f\_bar=+\infty$ after termination and $X^{(0)}$ has not been entirely eliminated. It may still be possible either to computer $f\_bar<\infty$ to delete all of $X^{(0)}$ by reducing the values of $\epsilon_X$ and $\epsilon_F$ and continuing to apply the process. To try to do so, we need only to reduce these tolerances and move the boxes from list $L_2$ to list $L_1$. We can then restart the algorithm from the beginning with or without use of increased precision.

Note that steps 712 through 725 are essentially the same as corresponding steps in the process for unconstrained optimization. This is because these steps are applied to a box that is certainly feasible.

In our process, we avoid using more complicated procedures until the simpler ones no longer make sufficient progress in reducing the current box. For example, we delay use of the John conditions until all other procedures become unproductive.

We avoid using procedures that use Taylor expansions until we have evidence that expanded forms provide sufficiently accurate approximations to functions.

Inequality constraints are often simple relations of the form $x_i b \leq b_i$ or $x_i \geq a_i$. Such constraints serve to determine the initial box $X^{(0)}$. Therefore, they are satisfied throughout $X^{(0)}$. Such constraints are omitted when applying any procedure designed to eliminate infeasible points. See steps 701, 704, 710 and 733.

In step 706 we use a line search to try to reduce $f\_bar$. This involves evaluating the gradient of $f$. We can avoid this evaluation by simply checking if the midpoint x of the box is feasible and, if so, using $f(x)$ as a candidate value for $f\_bar$. However, it helps to have a finite value of $f\_bar$ early, so the line search is worth doing when $f\_bar=+\infty$. Step 727 also uses a line search. It is less important here because a finite value of $f\_bar$ is likely to be computed in step 706. If there are a large number of constraints, then evaluating the gradient is not a dominant part of the work to do the line search.

Experience has shown that efficiency is enhanced if the sub-box X to be processed is chosen to be the one for which $\inf(f(X))$ is smallest among all candidate sub-boxes. This tends to cause a smaller value of $f\_bar$ to be computed early in the algorithm. Therefore, we return to step 703 to choose a new sub-box whenever the current box has substantially changed.

Suppose we find that $p_i(X) \leq 0$ for some value of i and some box X. Then $p_i(X') \leq 0$ for any $X' \subseteq X$. Therefore, we record the fact that $p_i(X) \leq 0$ so that we need not evaluate $p_i(X')$ for any $X' \subseteq X$.

It is possible that the procedures in step 719, 721, 723 or 740 prove the existence of a solution to the optimization problem. If so, the user can be informed of this fact. Such a solution may be local or global.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a computer system to solve a global inequality constrained optimization problem specified by a function f and a set of inequality constraints $p_j(x)=<0$ (i=1, ..., m), wherein f and $p_i$ are scalar functions of a vector $x=(x_1, x_2, x_3, \ldots x_n)$, the method comprising: receiving a representation of the function/and the set of inequality constraints at the computer system; storing the representation in a memory within the computer system; performing an interval inequality constrained global optimization process to compute guaranteed bounds on a globally minimum value of the function f(x) subject to the set of inequality constraints; wherein performing the interval global optimization process involves, applying term consistency to the set of inequality constraints over a sub-box X, and excluding any portion of the sub-box X that is proved to be in violation of at least one member of the set of inequality constraints; and recording the guaranteed bounds in the computer system memory; wherein applying term consistency involves: symbolically manipulating an equation within the computer system to solve for a term, $g(x'_j)$, thereby producing a modified equation $g(x'_j)=h(x)$, wherein the term $g(x'_j)$ is analytically inverted to produce an inverse function $g^{-1}(y)$; substituting the sub-box X into the modified equation to produce the equation $g(X'_j)=h(X)$; solving for $X'_j$ with the j-th element of the sub-box X to produce a new sub-box $X^+$; wherein the nuew sub-box $X^+$ contains all solutions of the equation within the sub-box X, and wherein the size of the new sub-box $X^+$ is less than or equal to the size of the sub-box X.

2. The method of claim 1, further comprising:
linearizing the set of inequality constraints to produce a set of linear inequality constraints with interval coefficients that enclose the nonlinear constraints;
preconditioning the set of linear inequality constraints through additive linear combinations to produce a preconditioned set of linear inequality constraints;
applying term consistency to the set of preconditioned linear inequality constraints over the sub-box X, and
excluding any portion of the sub-box X that violates any member of the set of preconditioned linear inequality constraints.

3. The method of claim 2, further comprising:
keeping track of a least upper bound $f\_bar$ of the function $f(x)$ at a feasible point x wherein $p_i(x) \leq 0$ (i=1, ..., m); and
including $f(x) \leq f\_bar$ in the set of inequality constraints prior to linearizing the set of inequality constraints.

4. The method of claim 2, further comprising removing from consideration any inequality constraints that are not violated by more than a specified amount for purposes of applying term consistency prior to linearizing the set of inequality constraints.

5. The method of claim 1, wherein performing the interval global optimization process involves:
keeping track of a least upper bound $f\_bar$ of the function $f(x)$ at a feasible point x;
removing from consideration any sub-box for which $f(x)>f\_bar$;
applying term consistency to the $f\_bar$ inequality $f(x) \leq f\_bar$ over the sub-box X; and
excluding any portion of the subbox X that violates the $f\_bar$ inequality.

6. The method of claim 1, wherein if the sub-box X is strictly feasible ($p_i(X)<0$ for all i=1, ..., n), performing the interval global optimization process involves:
determining a gradient g(x) of the function $f(x)$, wherein g(x) includes components $g_i(x)$ (i=1, ..., n);
removing from consideration any sub-box for which g(x) is bounded away from zero, thereby indicating that the sub-box does not include an extremum of $f(x)$; and applying term consistency to each component $g_i(x)=0$ ($i=1, \ldots, n$) of $g(x)=0$ over the sub-box X; and excluding any portion of the sub-box X that violates any component of $g(x)=0$.

7. The method of claim 1, wherein if the sub-box X is strictly feasible ($p_i(X)<0$ for all $i=1, \ldots, n$), performing the interval global optimization process involves:

determining diagonal elements $H_{ii}(x)$ ($i=1, \ldots, n$) of the Hessian of the function $f(x)$;

removing from consideration any sub-box for which $H_{ii}(x)$ a diagonal element of the Hessian over the sub-box X is always negative, indicating that the function $f$ is not convex over the sub-box X and consequently does not contain a global minimum within the sub-box X;

applying term consistency to each inequality $H_{ii}(x) \geq 0$ ($i=1, \ldots, n$) over the sub-box X; and excluding any portion of the subbox X that violates a Hessian inequality.

8. The method of claim 1, wherein if the sub-box X is strictly feasible ($p_i(X)<0$ for all $i=1, \ldots, n$), performing the interval global optimization process involves:

performing the Newton method, wherein performing the Newton method involves, computing the Jacobian $J(x,X)$ of the gradient of the function $f$ evaluated with respect to a point x over the sub-box X, computing an approximate inverse B of the center of $J(x,X)$, using the approximate inverse B to analytically determine the system $Bg(x)$, wherein $g(x)$ is the gradient of the function $f(x)$, and wherein $g(x)$ includes components $g_i(x)$ ($i=1, \ldots, n$);

applying term consistency to each component $(Bg(x))_i=0$ ($i=1, \ldots, n$) for each variable $x_i$ ($i=1, \ldots, n$) over the sub-box X; and excluding any portion of the sub-box X that violates a component.

9. The method of claim 1, further comprising performing the Newton method on the John conditions.

10. A computer-readable storage medium storing instructions that when executed by a computer cause the computer to perform a method for using a computer system to solve a global inequality constrained optimization problem specified by a function f and a set of inequality constraints $p_i(x)=<0$ ($i=1, \ldots m$), wherein f and $\rho_i$ are scalar functions of a vector $x=(x_1, x_2, x_3, \ldots x_n)$, the method comprising: receiving a representation of the function/and the set of inequality constraints at the computer system; storing the representation in a memory within the computer system, performing an interval inequality constrained global optimization process to compute guaranteed bounds on a globally minimum value of the function f(x) subject to the set of inequality constraints; wherein performing the interval global optimization process involves, applying term consistency to the set of inequality constraints over a sub-box X, and excluding any portion of the sub-box X that is proved to be in violation of at least one member of the set of inequality constraints; and recording the guaranteed bounds in the computer system memory; wherein applying term consistency involves: symbolically manipulating an equation within the computer system to solve for a term, $g(x'_j)$, thereby producing a modified equation $g(x'_j)=h(x)$, wherein the term $g(x'_j)$ is analytically inverted to produce an inverse function $g^{-1}(y)$; substituting the sub-box X into the modified equation to produce the equation $g(X'_j)=h(X)$; solving for $X'_j$ with the j-th element of the sub-box X to produce a new sub-box $X^+$; wherein the nuew sub-box $X^+$ contains all solutions of the equation within the sub-box X, and wherein the size of the new sub-box $X^+$ is less than or equal to the size of the sub-box X.

11. The computer-readable storage medium of claim 10, wherein the method further comprises:

linearizing the set of inequality constraints to produce a set of linear inequality constraints with interval coefficients that enclose the nonlinear constraints;

preconditioning the set of linear inequality constraints through additive linear combinations to produce a preconditioned set of linear inequality constraints;

applying term consistency to the set of preconditioned linear inequality constraints over the sub-box X, and excluding any portion of the sub-box X that violates any member of the set of preconditioned linear inequality constraints.

12. The computer-readable storage medium of claim 11, wherein the method further comprises:

keeping track of a least upper bound $f\_bar$ of the function $f(x)$ at a feasible point x wherein $p_i(x) \leq 0$ ($i=1, \ldots, m$); and including $f(x) \leq f\_bar$ in the set of inequality constraints prior to linearizing the set of inequality constraints.

13. The computer-readable storage medium of claim 11, wherein the method further comprises removing from consideration any inequality constraints that are not violated by more than a specified amount for purposes of applying term consistency prior to linearizing the set of inequality constraints.

14. The computer-readable storage medium of claim 10, wherein performing the interval global optimization process involves:

keeping track of a least upper bound $f\_bar$ of the function $f(x)$ at a feasible point x;

removing from consideration any sub-box for which $f(x) > f\_bar$;

applying term consistency to the $f\_bar$ inequality $f(x) \leq f\_bar$ over the sub-box X; and excluding any portion of the sub-box X that violates the $f\_bar$ inequality.

15. The computer-readable storage medium of claim 10, wherein if the sub-box X is strictly feasible ($p_i(X) \leq 0$ for all $i=1, \ldots, n$), performing the interval global optimization process involves:

determining a gradient $g(x)$ of the function $f(x)$, wherein $g(x)$ includes components $g_i(x)$ ($i=1, \ldots, n$);

removing from consideration any subbox for which $g(x)$ is bounded away from zero, thereby indicating that the subbox does not include an extremum of $f(x)$; and applying term consistency to each component $g_i(x)=0$ ($i=1, \ldots, n$) of $g(x)=0$ over the sub-box X; and excluding any portion of the sub-box X that violates any component of $g(x)=0$.

16. The computer-readable storage medium of claim 10, wherein if the sub-box X is strictly feasible ($p_i(X)<0$ for all $i=1, \ldots, n$), performing the interval global optimization process involves:

determining diagonal elements $H_{ii}(x)$ ($i=1, \ldots, n$) of the Hessian of the function $f(x)$;

removing from consideration any sub-box for which $H_{ii}(x)$ a diagonal element of the Hessian over the sub-box X is always negative, indicating that the function $f$ is not convex over the subbox X and consequently does not contain a global minimum within the sub-box X;

applying term consistency to each inequality $H_{ii}(x) \geq 0$ (i=1, ..., n) over the sub-box X; and excluding any portion of the sub-box X that violates a Hessian inequality.

17. The computer-readable storage medium of claim 10, wherein if the sub-box X is strictly feasible ($p_i(X)<0$ for all i=1, ..., n), performing the interval global optimization process involves:

performing the Newton method, wherein performing the Newton method involves, computing the Jacobian $J(x,X)$ of the gradient of the function $f$ evaluated with respect to a point x over the sub-box X, computing an approximate inverse B of the center of $J(x,X)$, using the approximate inverse B to analytically determine the system $Bg(x)$, wherein $g(x)$ is the gradient of the function $f(x)$, and wherein $g(x)$ includes components $g_i(x)$ (i=1, ..., n);

applying term consistency to each component $(Bg(x))_i = 0$ (i=1, ..., n) for each variable $x_i$ (i=1, ..., n) over the sub-box X; and excluding any portion of the sub-box X that violates a component.

18. The computer-readable storage medium of claim 10, wherein the method further comprises performing the Newton method on the John conditions.

19. An apparatus for using a computer system to solve a global inequality constrained optimization problem specified by a function f and a set of inequality constraints $p_i(x) = \leq 0$ (i=1, ..., m), wherein f and $p_i$ are scalar functions of a vector $x=(x_1, x_2, x_3, ... x_n)$, the apparatus comprising: a receiving mechanism that is configured to receive a representation of the function/and the set of inequality constraints at the computer system; a memory within the computer system for storing the representation, a global optimizer that is configured to perform an interval inequality constrained global optimization process to compute guaranteed bounds on a globally minimum value of the function f(x) subject to the set of inequality constraints, a term consistency mechanism within the global optimizer that is configured to, apply term consistency to the set of inequality constraints over a sub-box X, and to excluding any portion of the sub-box X that is proved to be in violation of at least one member of the set of inequality constraints; and a recording mechanism that is configured record the guarenteed bounds in the computer system memory; wherein applying term consistency involves: symbolically manipulating an equation within the computer system to solve for a term, $g(x'_j)$, thereby producing a modified equation $g(x'_j)=h(x)$, wherein the term $g(x'_j)$ is analytically inverted to produce an inverse function $g^{-1}(y)$; substituting the sub-box X into the modified equation to produce the equation $g(X'_j)=h(X)$; solving for $X'_j$ with the j-th element of the sub-box X to produce a new sub-box $X^+$; wherein the nuew sub-box $X^+$ contains all solutions of the equation within the sub-box X, and wherein the size of the sub-box $X^+$ is less than or equal to the size of the sub-box X.

20. The apparatus of claim 19, further comprising:

a linearizing mechanism that is configured to linearize the set of inequality constraints to produce a set of linear inequality constraints with interval coefficients that enclose the nonlinear constraints; and a preconditioning mechanism that is configured to precondition the set of linear inequality constraints through additive linear combinations to produce a preconditioned set of linear inequality constraints;

wherein the term consistency mechanism is configured to, apply term consistency to the set of preconditioned linear inequality constraints over the sub-box X, and to exclude any portion of the sub-box X that violates any member of the set of preconditioned linear inequality constraints.

21. The apparatus of claim 20, wherein the global optimizer is configured to:

keep track of a least upper bound $f\_bar$ of the function $f(x)$ at a feasible point x wherein $p_i(x) \leq 0$ (i=1, ..., m); and to include $f(x) \leq f\_bar$ in the set of inequality constraints prior to linearizing the set of inequality constraints.

22. The apparatus of claim 20, wherein the term consistency mechanism is configured to remove from consideration any inequality constraints that are not violated by more than a specified amount for purposes of applying term consistency prior to linearizing the set of inequality constraints.

23. The apparatus of claim 19, wherein the global optimizer is configured to, keep track of a least upper bound $f\_bar$ of the function $f(x)$ at a feasible point x, and to remove from consideration any sub-box for which $f(x) > f\_bar$;

wherein the term consistency mechanism is configured to, apply term consistency to the $f\_bar$ inequality $f(x) \leq f\_bar$ over the sub-box X, and to exclude any portion of the sub-box X that violates the $f\_bar$ inequality.

24. The apparatus of claim 19, wherein if the sub-box X is strictly feasible ($p_i(X) < 0$ for all i=1, ..., n):

the global optimizer is configured to, determine a gradient $g(x)$ of the function $f(x)$, wherein $g(x)$ includes components $g_i(x)$ (i=1, ..., n), and to remove from consideration any subbox for which $g(x)$ is bounded away from zero, thereby indicating that the sub-box does not include an extremum of $f(x)$; and the term consistency mechanism is configured to, apply term consistency to each component $g_i(x)=0$ (i=1, ..., n) of $g(x)=0$ over the subbox X, and to exclude any portion of the sub-box X that violates any component of $g(x)=0$.

25. The apparatus of claim 19, wherein if the sub-box X is strictly feasible ($p_i(X) < 0$ for all i=1, ..., n):

the global optimizer is configured to, determine diagonal elements $H_{ii}(x)$ (i=1, ..., n) of the Hessian of the function $f(x)$, and to remove from consideration any sub-box for which $H_{ii}(x)$ a diagonal element of the Hessian over the sub-box X is always negative, indicating that the function $f$ is not convex over the sub-box X and consequently does not contain a global minimum within the sub-box X; and the term consistency mechanism is configured to, apply term consistency to each inequality $H_{ii}(x) \geq 0$ (i=1, ..., n) over the sub-box X, and to exclude any portion of the sub-box X that violates a Hessian inequality.

26. The apparatus of claim 19, wherein if the sub-box X is strictly feasible $p_i(X)<0$ for all $i=1, \ldots, n$):

the global optimizer is configured to perform the Newton method, wherein performing the Newton method involves, computing the Jacobian $J(x,X)$ of the gradient of the function $f$ evaluated with respect to a point x over the sub-box X, computing an approximate inverse B of the center of $J(x,X)$, and using the approximate inverse B to analytically determine the system $Bg(x)$, wherein $g(x)$ is the gradient of the function $f(x)$, and wherein $g(x)$ includes components $g_i(x)$ ($i=1, \ldots, n$); and the term consistency mechanism is configured to, apply term consistency to each component $(Bg(x))_i=0$ ($i=1, \ldots, n$) for each variable $x_j$ ($i=1, \ldots, n$) over the sub-box X, and to exclude any portion of the sub-box X that violates a component.

27. The apparatus of claim 19, wherein the global optimizer is configured to apply the Newton method to the John conditions.

* * * * *

UNITED STATES PATENT AND TRADEMARK OFFICE
CERTIFICATE OF CORRECTION

PATENT NO. : 7,028,065 B2 Page 1 of 1
APPLICATION NO. : 10/017574
DATED : April 11, 2006
INVENTOR(S) : G. William Walster et al.

It is certified that error appears in the above-identified patent and that said Letters Patent is hereby corrected as shown below:

<u>Column 14,</u>
Line 1, delete "function/and" and replace with -- function $f$ and --.

<u>Column 15,</u>
Line 49, delete "function/and" and replace with -- function $f$ and --.

<u>Column 16,</u>
Line 2, delete "nuew" and replace with -- new --.

<u>Column 17,</u>
Line 23, delete "g,(x)" and replace with -- $g_i(x)$ --.
Line 35, delete "(x)=≤0" and replace with -- (x)=<0 --.
Line 38, delete "function/and" and replace with -- function $f$ and --.
Line 59, delete "nuew" and replace with -- new --.

Signed and Sealed this

Twentieth Day of June, 2006

JON W. DUDAS
*Director of the United States Patent and Trademark Office*